Jan. 26, 1954

E. H. MUELLER 2,667,325

GAS CONTROLLING VALVE

Filed March 19, 1951

INVENTOR.
Ervin H. Mueller
BY
Barnes, Kisselle, Laughlin & Raisch
ATTORNEYS.

Jan. 26, 1954
E. H. MUELLER
2,667,325
GAS CONTROLLING VALVE
Filed March 19, 1951
2 Sheets-Sheet 2
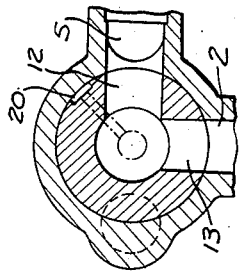
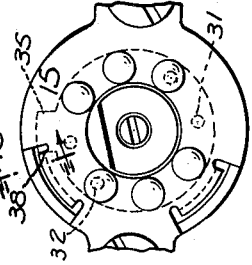
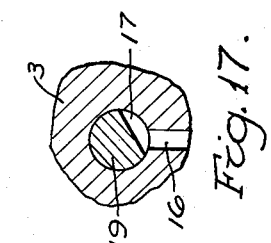
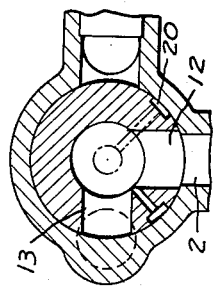
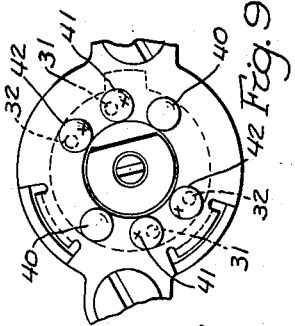
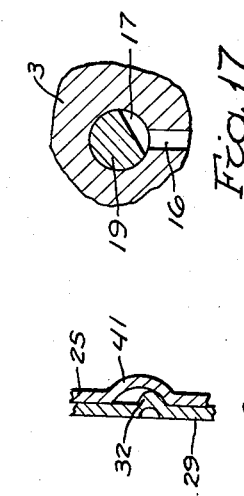
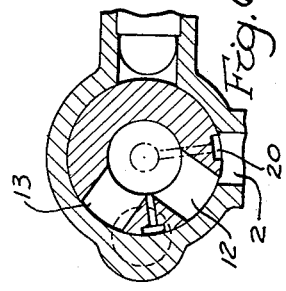
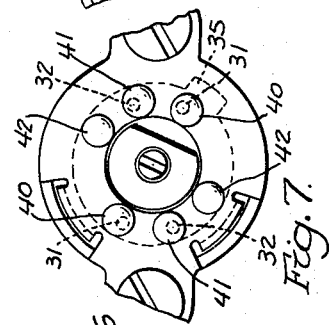
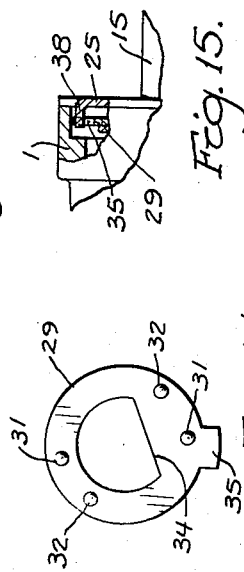
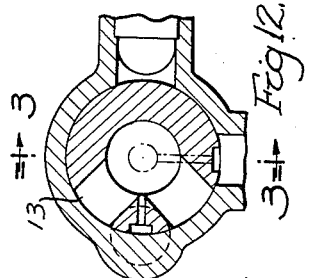
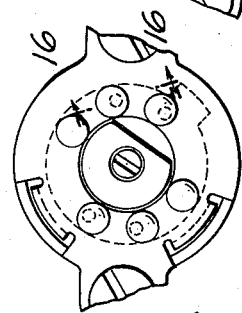
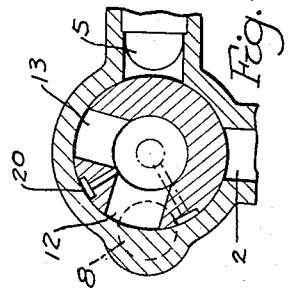
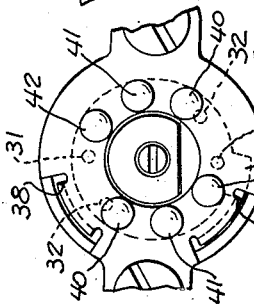
INVENTOR.
Ervin H. Mueller
BY
Barnes, Kisselle, Laughlin & Raisch
ATTORNEYS.

Patented Jan. 26, 1954

2,667,325

UNITED STATES PATENT OFFICE 2,667,325

GAS CONTROLLING VALVE

Ervin H. Mueller, Grosse Pointe, Mich.

Application March 19, 1951, Serial No. 216,372

4 Claims. (Cl. 251—163)

This invention relates to a valve for controlling the flow of gas to a burner.

The invention is concerned particularly with a valve for controlling the flow of gas to a burner in order to vary the flow of gas through the valve with resultant variation in the size of the flame at the burner. For example, the burner may have one main section for a full flame and a smaller section for a low or simmering flame. The object of the invention is to provide a valve for controlling the flow of gas selectively with an arrangement for giving an audible indication at the different positions of the valve. Accordingly, means are provided for effecting a snap or click at different valve positions and this means is of simple construction notwithstanding the fact that different positions may be indicated.

In such a valve and burner combination, it is required that any time the valve gives an audible indication when it is turned from "off" position to an "on" position there must be enough gas passing into the burner to provide initial ignition within a reasonable short period of time. However, once the ignition is started, the flame may be ensmalled to provide a very low simmer. The valve of the present invention is arranged to give an audible indication when it is turned from off position to what may be termed an igniting position and also to give an audible indication when it is turned from "on" position toward "off" position at the position of the low simmer which is between the "off" position and the igniting position.

The invention will be better understood when it is considered in conjunction with the accompanying drawings wherein a construction made in accordance with the invention is shown.

Fig. 4 is a cross sectional view taken substantially on line 4—4 of Fig. 1 showing the valve in "off" position.

Fig. 5 is an end view showing some parts in dotted lines and corresponding to the position shown in Fig. 4.

Fig. 6 is a view similar to Fig. 4 showing the igniting position.

Fig. 7 is a view similar to Fig. 5 but corresponding to the position shown in Fig. 6.

Fig. 8 is a cross sectional view similar to Fig. 4 showing the valve in full simmer position.

Fig. 9 is a view similar to Fig. 5 and corresponding to the position shown in Fig. 8.

Fig. 10 is a view similar to Fig. 4 showing the valve in full "on" position.

Fig. 11 is a view similar to Fig. 5 and corresponding to the position shown in Fig. 10.

Fig. 12 is a view similar to Fig. 4 and illustrating a low simmer position.

Fig. 13 is a view similar to Fig. 5 corresponding to the position shown in Fig. 12.

Fig. 14 is a plan view of a snap and limit washer.

Fig. 15 is a detailed sectional view taken substantially on line 15—15 of Fig. 11 illustrating a limiting stop.

Fig. 16 is an enlarged sectional view taken substantially on line 16—16 of Fig. 13 showing the interengaging elements for effecting the audible indication.

Fig. 17 is a sectional view indicating the throttling member for a passage in the valve member.

Figure 1:
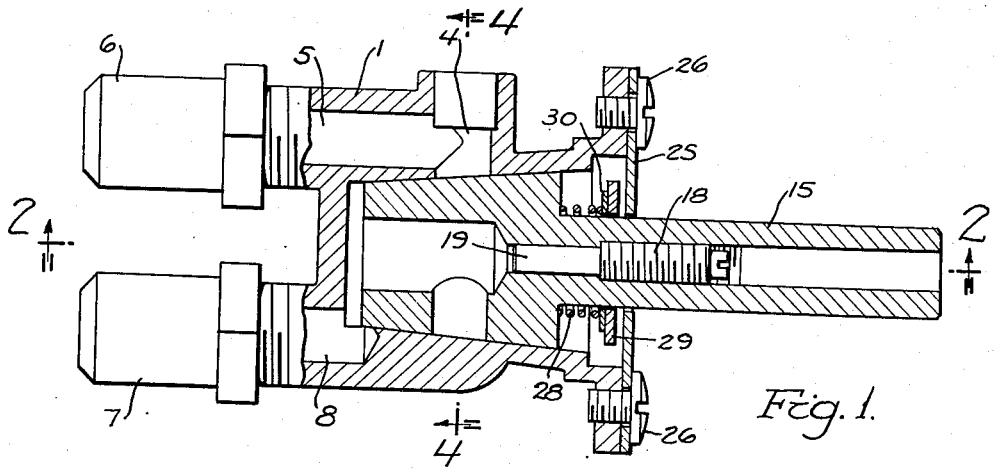
Fig. 1 is a view partly in cross section showing a valve body and valve member which may be employed with the present invention.

The valve body illustrated at 1 has an inlet 2 and a plug valve member 3 of tapered form seats in the tapered chamber of the body. The body has a lateral outlet passage 4 which connects to outlet passage 5 provided with the usual hood 6. The body has another outlet passage 8 leading to the usual hood 7, the passage 8 connecting into the end of the tapered chamber of the body.

Figure 3:
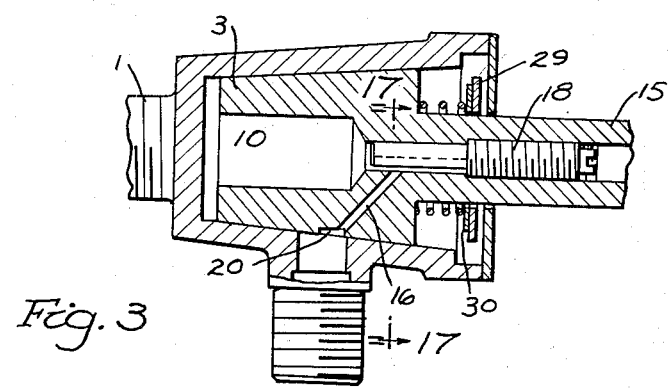
Fig. 3 is a sectional view with parts cut away similar to Fig. 2 but showing the valve in a simmer position and taken substantially on line 3—3 of Fig. 12.

The valve member 3 has an axial passage 10 and ports 12 and 13 connecting into the same (Fig. 4). The valve member also has a hollow stem 15 arranged to receive a handle and a small passage 16 which extends in an inclined manner, as shown in Fig. 3, and communicates with a bore 17 between the hollow of the handle and the passage 10. A throttling member 18 is screw threaded in the hollow stem and it has a D-shaped extension 19 extending into the bore 17. By turning the member 18 the flat side of the D may be made to throttle the passage 16, as shown in Fig. 17. The passage 16 has an enlarged end 20 which may be brought into and out of registry with the inlet 2.

There is a cap or closure plate 25 secured to the body as by means of screws 26 and the stem 15 extends therethrough. Between the cap and the valve member 3 is a coil spring 28 which acts upon a snap and limit washer 29, there being advantageously a small friction washer 30 disposed between the spring and the snap washer. The spring normally holds the valve member seated and holds the washer yieldably against the cap.

The audible indication is effected by interengaging elements on the cap and on the snap washer. The snap washer 29 (Fig. 14) is provided with four relatively small projections or bumps. These are arranged in pairs, there being a pair of projections as shown at 31 and another pair at 32. The washer is arranged to turn with the valve member and to this end the valve stem has a flat side, as shown in Fig. 5 and other views, and the washer has a flat face 34 for cooperating therewith. The washer also has a projection 35 for cooperation with limit stops. These stops are conveniently formed by turned-down segments on the cover plate, one stop being shown at 37 and the other at 38, and they lie in a path of and to be engaged by the projection 35. The stop 38 is shown in detail in Fig. 15 and the stop 37 is similar.

The cover plate 25 is provided with a group of relieved areas for cooperation with the projections on the washer. These relieved portions, as shown in Fig. 16, may merely be recesses provided by stamping the same in the metal of the cap and the projections on the washer may be similarly formed merely by subjecting the washer to stamping or press operation. This is but one form of relieved portions or depressions. It will be noted, however, particularly by reference to Fig. 16, that the dimension across the relieved portion, which herein is the concavity of the depressed portion, is considerably greater than the dimension measured circumferentially of the individual projections. As shown in Fig. 5, and other views, the cover plate has six depressed portions which, however, appear as rounded convexities on the exterior of the cover plate and these are arranged in pairs, so to speak. There are two relief portions at 40, two at 41 and two at 42. We have stated that the thus formed cooperating portions on the washer and on the cap are arranged in pairs as this is a convenient way of identifying the same when considering the function and performance thereof.

Figure 2:
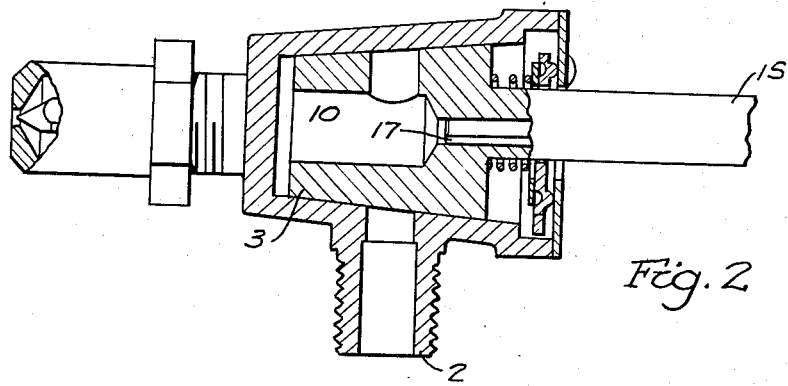
Fig. 2 is a sectional view taken substantially on line 2—2 of Fig. 1 showing the valve in "off" position.

In the normal operation of the valve member it will be appreciated that the spring urges the washer toward the cap. When the projections are disaligned from the recesses in the cap, they ride upon the inside surface of the cap and the washer is spaced from the cap as shown in Figs. 1 and 2. When the projections come into registry with the relieved portions on the cap, the spring snaps the washer axially so that the washer and the cap come together with an audible snap or click which position is shown in Fig. 16. The washer 29 fits on the stem 15 with the normal tolerance of the industry in structures of this type, and this tolerance provides sufficient looseness so that the washer has a small amount of rotative action relative to the stem and valve member so that the washer may quickly shift both axially and rotatably to provide the audible click when the projections snap into the recesses. This lost play construction is in accordance with the Philip S. Harper Patents No. 1,707,007 of 1929 and No. 1,964,287 of 1934. The projections on the washer and the cooperating clearance or recess formation on the cap are not evenly spaced. However, the arrangement of projections on the washer is such as to provide for an engagement with the cap so as to prevent the washer from tilting or cocking relative to the axis of the stem.

The construction is so arranged and the proportions of the parts and the position of the parts are such as to take advantage of the normal tendency of persistence of movement. When a person is turning the valve and hears a click it is natural that the valve cannot be stopped instanter at the click. In the normal operation of the valve, there is an unavoidable over control or over movement. The present invention takes advantage of this condition as will be seen in considering the operation of the valve.

As will be seen by considering Fig. 4, the valve is off, inasmuch as the inlet 2 is closed. At this time the projections, shown in dotted lines in Fig. 5 are riding on the face of the cap. Therefore, the washer is spaced from the cap, as shown in Figs. 1 and 2, and in addition the washer is held in true position by reason of the contact of the four projections with the face of the cap. In "off" postion the projection 35 abuts the stop 37. When the valve is turned toward "on" position, which is counter-clockwise as the views 4 to 13 are considered, the pair of projections 32 ride over the recesses 40 and cannot snap into the same because the projections 31 continue to ride on the face of the cap. Therefore, when the valve is turned counter-clockwise from "off" position, the first audible indication is when the projections snap into the recesses 40 and 41, as shown in Fig. 7. Due to the persistence of movement above mentioned, and due to the fact that the projections do not fit snugly into the recesses, the turning movement continues with an over control action, and the projections, upon snapping into the recesses, substantially move across or traverse the same before the valve is stopped. The resistance required to move the projections out of the recesses is not sufficient to provide an indication of valve position to the operator. This position is indicated in Fig. 6. At this time, it will be noted that the valve has moved far enough so that inlet 20 of the small passage 16 and the passage 12 are partially registered with the inlet. Under this condition sufficient gas enters into the passage 10 for flow through the outlet 8 and hood 7 to provide for an efficient igniting of the gas issuing from a burner.

If the valve be turned further counter-clockwise, the projections are forced out of the recesses 40 and 41 and then they snap into the recesses 41 and 42. This position is indicated in Figs. 8 and 9. At this point, the passage 12 is substantially in full alignment with the inlet 2 and thus gas continues to be supplied to the small burner section through the outlet 8. The small burner has a small capacity and the difference in the flame provided by the two positions shown in Figs. 6 and 8 is very slight and, indeed, may not even be noticeable. In other words, in the Fig. 8 position, the valve has much more capacity than the burner. Therefore, it doesn't make much difference whether or not the passage 12 is accurately aligned with the inlet 2 at this position. In fact, there will be an over control the same as there was when arriving at the Fig. 6 position in that the projections will come to rest in the recesses as shown by the circular dotted lines in Fig. 9.

Upon continued counter-clockwise movement of the valve member, the position shown in Figs. 10 and 11 is attained at which time the projection 35 abuts against the limit stop 38. In this position, the port 13 registers with the inlet and the port 12 registers with the outlet 5. Therefore, it will be seen, by considering Fig. 1, that gas flows through both outlets 8 and 5 so that both sections of the burner are supplied with gas. It will be noted that in the full "on" position the projections 31 ride upon the face of the cap as they are disaligned from any of the recesses.

Now, in turning the valve clockwise, from the full "on" position, shown in Figs. 10 and 11, toward "off" position, the projections 31 ride over the recesses 42 since the projections 32 are in engagement with the face of the cap, and the first audible indication is given when the position shown in Figs 8 and 9 is attained. At this time, however, due to the over control action, each projection has moved substantially across its corresponding recess and is in a position as approximately indicated by the corresponding $x$ in Fig. 9. In this position, the port 12 registers with the inlet 2 but as stated above, inasmuch as the port is so large, there is no detectable difference in the gas supplied to the simmer burner, between the two positions depending upon whether the valve is being turned counter-clockwise or clockwise.

When the valve is turned further clockwise the projections snap into the recesses 40 and 41 and due to the over control action the valve comes to rest in a position indicated by Figs. 12 and 13. It will be noted that although the projections have snapped into the recesses 40 and 41 that they are on the opposite sides of these recesses relative to the position shown in Fig. 7. This is the low simmer position, the port 12 is disaligned from the inlet 2 so that only a small amount of gas can flow through the passage 16 and thence to the simmer burner through the small passage 16.

When the valve is turned further clockwise, the projection 35 strikes the limit shoulder 37 and the valve is in "off" position as shown in Figs. 4 and 5.

In considering the operation in general, Figs. 4 and 5 indicate the "off" position; Figs. 6 and 7 indicate an igniting position. Figs. 7 and 9 indicate a simmer position; Figs. 10 and 11 indicate a full "on" position; Figs. 12 and 13 indicate a low simmer position. In this last position, the flame is too low for proper ignition and yet the gas will continue to burn having once been ignited.

So, in general, when the valve is turned from "off" position to the first click position, sufficient gas flows for ignition purposes and there is a simmer flame. In this action the position shown in Figs. 12 and 13 is skipped or passed over. When the valve is turned to the next click position, as shown in Figs. 8 and 9, the simmer flame persists. Now at this point, there is an interesting operation: If the valve be turned clockwise from the simmer position shown in Figs. 8 and 9, to the next snap position, the position attained is that of low simmer flame shown in Figs. 12 and 13. In this action, the position shown in Figs. 6 and 7 is skipped or passed over. Therefore, once ignition has been attained, the valve may be turned from simmer position to low simmer position and back to simmer position with a click indicating each position completely skipping the position of Figs. 6 and 7. Stating the matter in another way, the valve is turned on by moving from the Fig. 4 position to a click at the Fig. 6 position, then to a click at the Fig. 8 position, and then to a stop at the Fig. 10 position; the valve is turned off from the full "on" Fig. 10 position to a click substantially at the Fig. 8 position, then to a click at the Fig. 12 position, and then to a stop at the "off" position of Fig. 4. Yet the valve may be turned back and forth between the positions shown in Figs. 8 and 12 completely skipping the position shown in Fig. 6. That is to say, the Fig. 6 position is skipped in the sense that the valve moves past this position and there is no audible indication.

I claim:

1. In a valve for controlling the flow of gas to a gas burner, said valve having a valve body and a turnable valve member, with the valve body and the valve member having passageways and ports, some of which are arranged to be brought into and out of registry by the turning of the valve member to effect different gas flow conditions through the valve; a first member non-rotatably secured to the valve body, a second member secured to the valve member to turn therewith, spring means normally urging said members into engagement with each other, a projection on one member extending toward the other member, means forming a relieved area on the other member for receiving the projection under the action of the spring means, the second member being sufficiently loose on the valve member so that the projection snaps into the relieved area with a slight rotative motion of the second member relative to the valve member, the cross dimension of the relieved area measured along the arc of travel of the projection being substantially greater than the cross dimension of the projection measured along the same arc, whereby, when the valve member is turned in one direction from "off" position, the persistence of motion causes the projection to substantially traverse the relieved area into which it snaps, to indicate one "on" position of the valve member relative to the valve body, which provides sufficient flow of gas to initiate ignition, and when the valve member is turned in the opposite direction and the projection snaps into the same relieved area, the projection substantially traverses said relieved area to indicate another position of the valve member relative to the valve body for low rate of gas flow insufficient to satisfactorily initiate ignition.

2. In a valve for controlling the flow of gas to a gas burner, said valve having a valve body and a turnable valve member, with the valve body and the valve member having passageways and ports, some of which are arranged to be brought into and out of registry by the turning of the valve member to effect different gas flow conditions through the valve; a first member non-rotatably secured to the valve body, a second member secured to the valve member to turn therewith, spring means normally holding said two members yieldably in engagement with each other, one member having a plurality of projections thereon facing the other member and the other member having a plurality of relieved areas therein for receiving the projections under the action of the spring means, the second member being sufficiently loose on the valve member so that the projections snap into the relieved areas with a slight rotative motion of the second member relative to the valve member, to produce an audible indication, the cross dimensions of the relieved areas, measured along the arc of travel of the projections, being substantially greater than the cross dimensions of the projections measured along the same arc, whereby, when the valve member is turned in one direction from "off" position, the persistence of motion causes the projections to substantially traverse the relieved areas into which they snap, to indicate one "on" position of the valve member relative to the valve body which provides sufficient flow of gas to initiate ignition, and when the valve member is turned in the opposite direction and the projections snap into the same relieved areas, the projections substantially traverse said same relieved areas to indicate another position of the valve member relative to the valve body for low rate of gas flow insufficient to satisfactorily initiate ignition.

3. In a valve for controlling the flow of gas to a gas burner, said valve having a valve body and a turnable valve member, with the valve body and the valve member having passageways and ports, some of which are arranged to be brought into and out of registry by the turning of the valve member to effect different gas flow conditions through the valve; a cap non-rotatably secured to the valve body, a washer secured to the valve member to turn therewith, spring means normally holding the washer and cap in engagement with each other, two pairs of substantially oppositely positioned projections on the washer, three pairs of substantially oppositely positioned relieved areas in the cap, the two pairs of projections on the washer being arranged to be received in two pairs of recesses of the cap under the action of the spring means, the washer being sufficiently loose on the valve member so that the projections snap into the recesses with a slight rotative motion of the washer relative to the valve member to produce an audible indication some of the projections riding on the face of the cap while other projections move across relieved areas without entering the same, the dimensions of the relieved areas measured along the arc of travel of the projections, being substantially greater than the cross dimensions of the projections measured along the same arc, whereby, when the valve member is turned in one direction from "off" position, the persistence of motion causes the projections to substantially traverse the relieved areas into which they snap, to indicate one "on" position of the valve member relative to the valve body which provides sufficient flow of gas as to initiate ignition, and when the valve member is turned in the opposite direction the projections snap into the same relieved areas and substantially traverse said same relieved areas, to indicate another "on" position of the valve member relative to the valve body sufficient to maintain combustion but insufficient to satisfactorily initiate ignition.

4. In a valve for controlling the flow of gas to a gas burner, said valve having a valve body and a turnable valve member, with the valve body and valve member having passageways and ports, some of which are arranged to be brought into and out of registry by the turning of the valve member to effect different valve conditions including an "off" position, a low simmer position, an igniting position and a simmer position, all progressively arranged as regards the position of the valve member and valve body; a member non-rotatably secured to the valve body, another member secured to the valve member to turn therewith, spring means normally holding the two members in engagement with each other, one member having a projection thereon, the other member having a relieved area therein for receiving the projection under the action of the spring means, the second named member being sufficiently loose on the valve member so that the projection snaps into the relieved area with a slight rotative motion of the second member relative to the valve member to produce an audible indication, the cross dimension of the relieved area, measured along the arc of travel of the projection, being substantially greater than the cross dimension of the projection measured along the same arc, whereby, when the valve member is turned in one direction from "off" position and the projection snaps into the relieved area, the persistence of motion causes the projection to substantially traverse the relieved area into which it snaps with the valve member moving past the low simmer position and coming to rest at an "on" position sufficient to initiate ignition, and when the valve member is turned in the opposite direction from an "on" position, and the projection snaps into the same relieved area, the persistence of motion causes the projection to substantially traverse said same relieved area with the valve member moving past the first named "on" position and coming to rest at the low simmer position sufficient to maintain combustion but insufficient to initiate ignition.

ERVIN H. MUELLER.

References Cited in the file of this patent
UNITED STATES PATENTS

| Number | Name | Date |
|---|---|---|
| 2,299,666 | Turner et al. | Oct. 20, 1942 |
| 2,334,346 | Mueller | Nov. 16, 1943 |
| 2,361,204 | Hollins | Oct. 24, 1944 |
| 2,530,006 | Ellithorpe | Nov. 14, 1950 |
| 2,592,056 | Mueller | Apr. 3, 1952 |